United States Patent [19]

Russell

[11] Patent Number: 4,560,250
[45] Date of Patent: Dec. 24, 1985

[54] EXPLOSION-PROOF AND FOG-FREE DAY AND NIGHT OUTSIDE REAR VIEW MIRROR INCORPORATING VARIABLE POSITION ACTUATOR

[76] Inventor: Carl D. Russell, P.O. Box 334, Sallisaw, Okla. 74955

[21] Appl. No.: 414,920

[22] Filed: Sep. 3, 1982

[51] Int. Cl.⁴ ............................................. G02B 17/00
[52] U.S. Cl. ..................................... 350/279; 350/588
[58] Field of Search .............. 350/278, 279, 280, 281, 350/588, 589, 590, 310

[56] References Cited

U.S. PATENT DOCUMENTS 3,877,780  4/1975  Taylor ................................ 350/588
4,371,235  2/1983  Locke, Sr. ......................... 350/280

Primary Examiner—John K. Corbin
Assistant Examiner—Paul M. Dzierzynski
Attorney, Agent, or Firm—Wilfred G. Caldwell

[57] ABSTRACT

A housing, which is secured for pivoting or biased in a frame by a manual actuated sheathed cable extending from inside the cab, supports a glass sealed at an angle in front of a mirror and heater which aids in defrosting the front of the glass and provides for viewing of a bright reflection or dim image. The housing encloses in dry vapors a mirror, a heater, and a vapor-proof collapsible bag sealed to tubular electrical conduits which are sealed through the housing to provide a passage out into the atmosphere. The electrical conduits supply electrical current through the housing from the battery to the heater. The dry vapors' temperature determines the pressure and space the vapor-proof expandable or collapsible sealed bag occupies in the housing allowing the atmospheric pressure to control the dry vapor pressure and thus prevent explosion or vacuum effect. These predetermined conditions result in an all-weather outside rear view mirror.

2 Claims, 6 Drawing Figures

U.S. Patent   Dec. 24, 1985   4,560,250
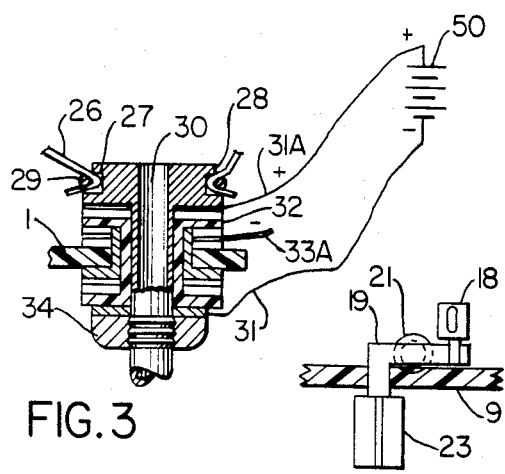
FIG. 3
FIG. 4
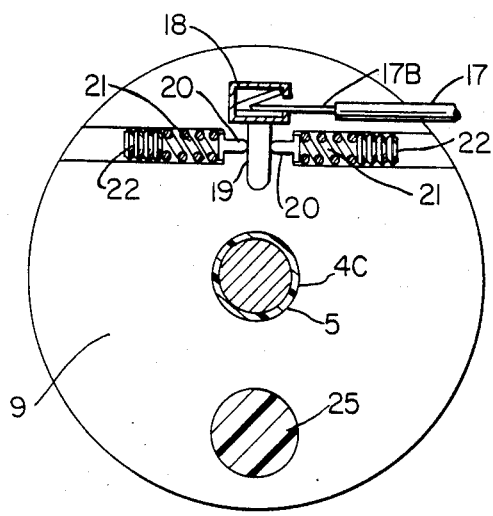
FIG. 5
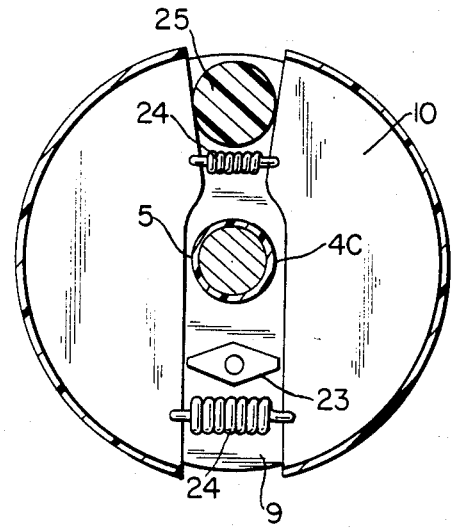
FIG. 6
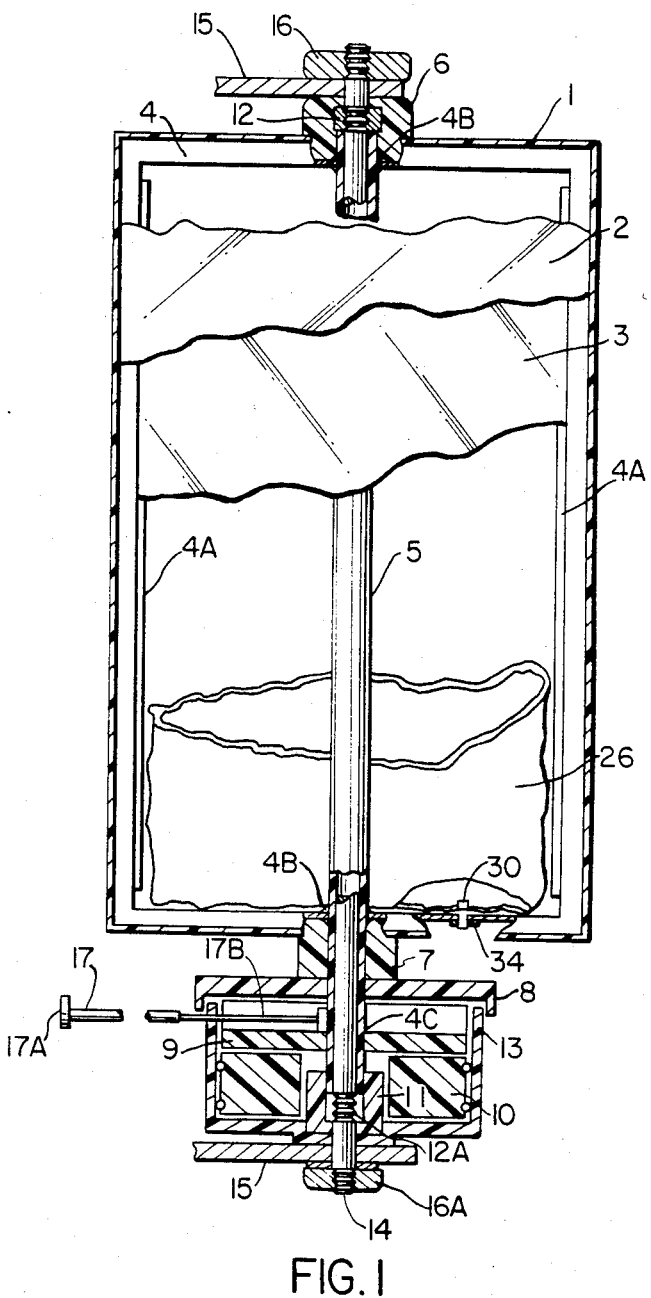
FIG. 1
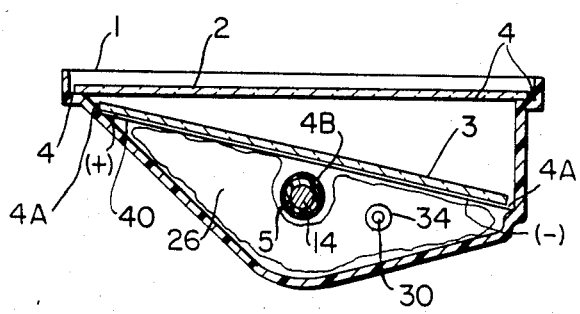
FIG. 2

EXPLOSION-PROOF AND FOG-FREE DAY AND NIGHT OUTSIDE REAR VIEW MIRROR INCORPORATING VARIABLE POSITION ACTUATOR

The prior art is the type stated in my Wide Rear View Day and Night Outside Mirror U.S. Pat. No. 3,836,235, 9-17-1974, and Manual Actuated Remote Controlled Multipurpose Mirror Ser. No. 945,015, now abandoned, 9-22-1978 and Continuation-in-part of Ser. No. 135,896, 3-31-1980, now abandoned.

The present invention is an improvement permitting the use of weaker housings, and consequently much less expensive, to cope with extreme heat because the heat from the sun or from the electric heater might cause the dry vapors inside the housing to explode or break the seals and the dry vapors to seep out. Then, in low temperature, which reduces pressure inside the housing inducing the vacuum effect, the air at atmospheric pressure containing moisture, would seep back in, causing the surface of the glass and the mirror to fog, destroying the reflection. In a sealed mirror of the type in which the glass is secured in front, the mirror cannot be cleaned.

The invention comprises an explosion-proof and fog-free outside day and night rear view mirror incorporating variable position actuator means for a vehicle, preferably a pick-up or heavy tractor wherein heavy supporting means extend outwardly from the vehicle to support a tall mirror case against extreme forces. The supporting means penetrate the case vertically, and preferably, centrally to comprise a pivot axis therein, the combination supporting means and pivot axis there being generally a U-shaped frame with the mouth of the U being attached to the vehicle. A mirror frame which may include a horizontal web is supported by the pivot axis centrally forwardly of the web. The glass in front of mirror is sealed by bonding and supported by the housing spaced at an angle approximately 13 degrees to the mirror, the edges on one side of the mirror and on one side of the glass are in close contact and on the other side, the edges of the glass and the mirror are substantially apart. As the mirror is secured on each side of the housing internally and being shorter than the housing and spaced to allow the circulation of dry vapors over and under the mirror to transfer heat from the electrical heater from back of the mirror to defrost the front of the glass. A tubular shaft extendign upright through the central portion is bonded in each end of the housing to support and to aid in forming a housing to become a sealed closure with a tubular shaft pivotably supported in bushings which are least effected by temperature and secured by a nutted rod extending through the the passage in the bushings, tubular shaft and brake drum to the framework extending from the cab of the vehicle.

The mirror housing encompasses a vapor-proof expandable or collapsible sealed; bag within the back portion of the housing to reduce the dry vapor space within the housing. The bag is secured and sealed to the end of the tubular electrical conduit that may provide electrical currents from the battery to heater extending through a sealed passage out of the housing into the atmosphere to relieve explosive pressure of the dry vapors induced within the housing by sun or by electrical heat by collapsing the bag, forcing the air out into the atmosphere. This provides a greater space in the housing for the dry vapors which reduces the pressure and relieves the strain on the glass and bonding and prevents leakage of the bonding. The dry vapors are allowed to remain in the housing at this reduced pressure and as the space within the housing cools down and the pressurizing effect decreases, inducing a vacuum effect, the bag expands as the atmospheric air pressure returns. This process continues and the pressure in the mirror remains at a safe level, either below the possibility of explosion or above the vacuum effect. The outside moisture-laden air is prevented from infiltrating the sealed housing to fog the surface of the glass and the mirror.

The mirror housing is moved pivotally suitably counter-clockwise to a position for bright day viewing or clockwise to a position for dim night viewing by a single boden cable in a device where a brake plate is secured to the lower portion of the tubular shaft which is provided with brake shoes expanded by a pivotal spreader connected to an arm spring biased extending outward provided with a fastener which allows a wire to be inserted into an opening allowing the end of the wire to expand and secure the wire from movement in either direction unitizing the wire and the connector to the arm. This allows the boden cable extending into the cab to be manually manipulated to overcome spring bias of arm releasing spreader bias on brake shoes allowing spring bias to withdraw brake shoes from brake drums permitting the secured brake plate and the tubular shaft and the supported mirror in housing to be pivoted suitably for viewing from any seating position inside the cab and upon release of the boden cable the spring bias on the arm is allowed to return the spreader overcoming spring bias and bias the brake shoes in the brake drums secured to the frame extending from the cab of the vehicle.

The first object of the invention is to enhance a day and night outside rear view mirror to be useful in all weather conditions.

The second object is to prevent atmospheric air pressure with moisture to infiltrate the dry vapors within the housing which fog the glass and mirror surface.

The third object is to provide permanent sealing of dry vapors in the mirror housing by reducing pressure build-up through the use of atmospheric pressure.

The invention will be further described in detail in connection with the illustrations of a preferred embodiment thereof, as shown in the drawings wherein:

BRIEF SUMMARY OF THE DRAWINGS

FIG. 1 is a front elevation of the mirror and actuating assembly;

FIG. 2 is an end view of the structure of the housing of FIG. 1;

FIG. 3 is a detailed view of the dual electrical conduits;

FIG. 4 shows a pivotal arm and spreader;

FIG. 5 is a top view of brake plate;

FIG. 6 is a bottom view of brake plate and brake shoes;

DESCRIPTION OF PREFERRED EMBODIMENT

FIG. 1 shows a face view of the explosion-proof and fog-free day and night outside rear view mirror and a split view of the variable position actuator. The housing 1 in a lengthwise vertical working position with most of the glass 2 broken away disclosing the method of sealing by bonding glass 2 to the prepared area 4 around the face of housing 1. The mirror 3 is mostly broken away disclosing the side bonding areas 4A for securing the shortened mirror on the sides only in the interior of housing 1 allowing space for dry vapors to flow over and under mirror 3 aiding battery 50 and electrical heater 40 to defrost outside of glass 2.

FIG. 2 shows a split end view of the housing 1 showing the glass 2 in an angled position with mirror 3. The edges of glass 2 and the edges of mirror 3 are in close contact on one side and on the other side glass 2 and mirror 3 are substantially apart. Also, further defining bonding surface 4 for glass 2, bonding surface 4A for mirror 3 and bonding surface 4B for tubular shaft 5 in ends of housing. Also shown in FIG. 3 the vapor-proof expandable or collapsible sealed bag 26 made of a vapor-proof stretchable rubbery material large enough to fill about 70 percent of the interior space of the back portion of the mirror housing 1 having an air passage secured and sealed to the end of tubular electrical conduit 30. The bag is placed in the back portion of housing 1 with a mesh bag containing silica gel or other drying agent with the electrical conduits extending through the opening prepared in housing 1 in procedure shown in FIG. 3. However, the nut 34 is not tightened to form a seal until the mirror has all the portion sealed to form a housing closure. Then, the bag is lightly inflated to expand to take out all wrinkles and normalize the bag in which only the vapors remain at atmospheric air pressure around the bag and the front portion of the housing. Then, the compression nut is tightened to seal conduits 30A and the bag inflating equipment is detached allowing atmospheric air pressure in the bag which assembly of electrical conduits and sealing is further described as shown in FIG. 3. Bag 26 with opening 27 sealed in groove 28 and secured by band 28 to the end of electrical conduit 30 constructed of tubular portion showing electrical conduits 31 connecting through housing 1 to electrical conduit 31A provided with an insulator 32 and electrical conduit 33 also connecting through housing 1 to electrical conduit 33A. These conduits are sealed in housing 1 by compression by threaded tubular conduit 30 and nut 34. This provides two electrical current paths from the battery 50 outside of housing 1 to the electrical heater 40 inside the dry vapors in housing 1.

FIG. 1 disclosing a tubular shaft 5 upright in the central portion of housing 1 extending through each end where it is bonded surface 4B to housing 1 to seal and unitize to become a pivotal support in positioning mirror 3 for viewing. The top end of shaft 5 is supported pivotally in alignment by bushing 6 on top securable and adjustable for tubular shaft 5 end tolerance by screwing of nut 12 on rod 14. The bottom end of tubular shaft 5 extends through tubular housing 7, brake drum cover 8 and through brake plate 9 which is bonded 4C secure to unitize in aiding in positioning and securing housing 1 and the tubular shaft 5 extends further down to nut 12A secured bushing 11 to support and provide pivotal alignment. Brake shoes 10 shown in FIGS. 1 & 6 in brake drum 13 shown in FIG. 1. Brake drum 13 is secured by nut 12A to frame 15 threaded on rod 14 extending down through nut 12, bushing 6, tubular shaft 5, nut 12A, brake drum 13 to frame 15 and secured by nut 16A.

The boden cable 17 with the knob end 17A shown in FIG. 1 and not shown in the cab to be manually manipulated by the extending wire end 17B shown in FIG. 5 being secured to pivotal fastener 18 shown in FIGS. 4 & 5 which holds movement in either direction to actuate arm 19 against movement limiters 20 shown in FIG. 5 of biasing springs 21 which have biasing adjustment screw plugs 22 as arm 19 extends through brake plate 9 shown in FIG. 4 where an enlarged portion forms a brake shoe spreader 23, also shown in FIG. 6 is effected by the manipulation of the boden cable shown in FIGS. 1 & 5. Knob 17A shown in FIG. 1 pushed in or pulled out, rotates the brake shoe spreader 23 as shown in FIG. 6 releasing (not shown) the biasing of the brake shoes 10 in the brake drum 13 allowing springs 24 to withdraw brake shoes 10 from brake drum 13 allowing the continued pulling or pushing of the boden cable knob 17A to move the mirror in position for viewing and discontinue the pulling or pushing the boden cable 17A and upon the releasing of the knob 17A, spring 21 allows bias to return the arm 19 to the normal position inducing spreader 23 to overcome spring 24 bias and apply brake shoes 10 into brake drum 13 and by the aid of anchor pin 25 in brake plate 9 to bias the housing 1 to frame 15 for rear viewing.

OPERATION

The housing holding the glass and the mirror in a frame extending from the vehicle may be pivoted clockwise for a bright reflection and counter-clockwise for a dim image from inside the cab by a wire in a sheathed cable which extends from the cab and is provided with a knob for manual actuation.

What is claimed:

1. A day and night outside vehicular rear view mirror comprising in combination:

a housing for the mirror;

a glass closing the housing from the atmosphere with dry vapors therein with said mirror contained within the housing and fixed at one end thereof at an acute angle of approximately 13° to the glass;

a frame for attachment to a vehicle to support said housing for pivotal motion relative thereto;

means actuable from the interior of the vehicle for pivotally changing the housing position relative to the vehicle operators viewing direction for bright day viewing or dim night viewing; and, a vapor-proof expandable-collapsible sealed bag within the housing and having an opening in communication with the atmosphere whereby expansion of the dry vapors in the housing causes the bag to expel atmospheric gases into the atmosphere and contraction of the dry vapors in the housing causes entry of atmospheric gases into the bag thereby avoiding rupture of the mirror housing due to atmospheric pressure changes.

2. The mirror of claim 1 further comprising:

means for locking the housing in any selected position.

* * * * *